March 14, 1933. H. M. KEITH 1,901,519
VACUUM CLEANER
Filed Nov. 5, 1931
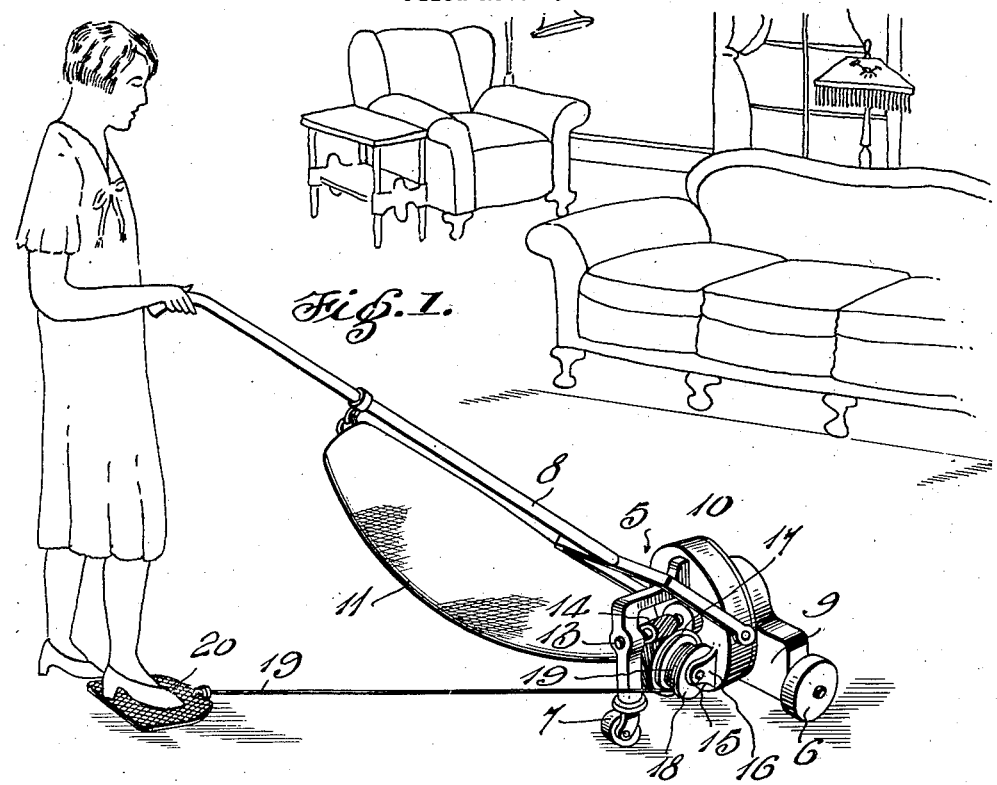
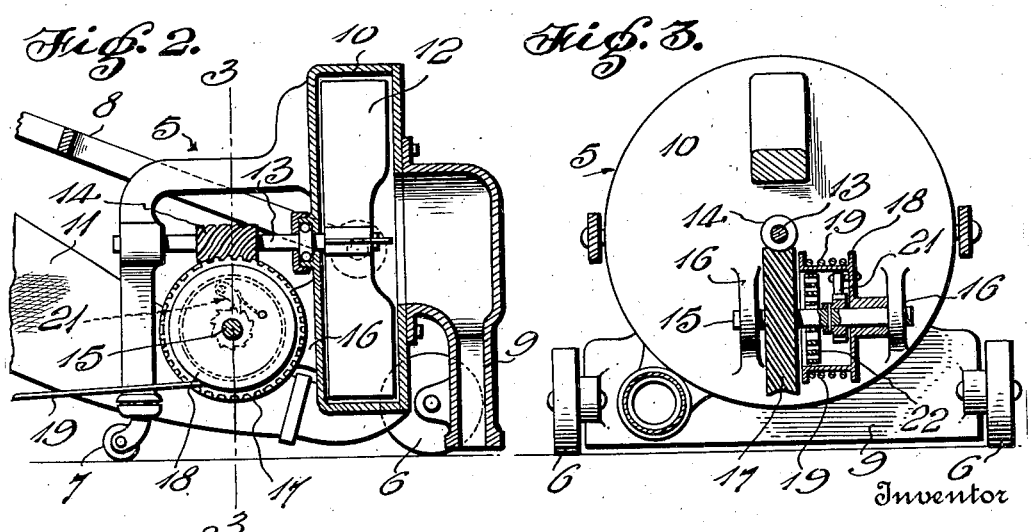
Inventor
Henry M. Keith
By H. B. Wilson & Co.
Attorneys.

Patented Mar. 14, 1933

1,901,519

UNITED STATES PATENT OFFICE

HENRY M. KEITH, OF HARRISBURG, ILLINOIS

VACUUM CLEANER

Application filed November 5, 1931. Serial No. 573,221.

While the present disclosure of the invention relates to a vacuum cleaner, the invention could be used with advantage in connection with floor sweepers, floor waxers, or even lawn mowers, for the gist of the invention resides in novel means for driving a rotatable member mounted upon a wheeled carriage, said carriage being provided with a rearwardly projecting handle by means of which it may be moved forwardly and rearwardly.

It is the object of the invention to provide unique means for driving the rotatable member (whether a vacuum cleaner fan, floor waxer or brush, or a rotary cutter) without the aid of an electric motor, thereby producing a structure which may be used to advantage in localities in which electric current is not available.

With the foregoing in view, the invention resides in the novel subject matter hereinafter described and claimed, description being accomplished by reference to the accompanying drawing.

Fig. 1 is a perspective view showing a vacuum cleaner embodying the invention.

Fig. 2 is an enlarged vertical longitudinal sectional view through the carriage and associated parts.

Fig. 3 is a vertical transverse sectional view substantially on line 3—3 of Fig. 2.

In the drawing above briefly described, the numeral 5 denotes a carriage provided with two front wheels 6 and a rear caster wheel 7, said carriage being equipped with a rearwardly projecting handle 8 by means of which it may be moved to and fro. In the present showing, the carriage 5 embodies a suction nozzle 9 and a fan housing 10 communicating with said nozzle and discharging into a conventional dust bag 11. The housing 10 contains a fan 12 whose shaft 13 projects rearwardly beyond the housing 10 and is provided with a steeply pitched worm 14. Transverse to the shaft 13, is another shaft 15 which in the present showing is behind the housing 10 and mounted in appropriate bearings 16 carried by said housing. The shaft 15 is provided with a steeply pitched worm wheel 17 meshing with the worm 14 for driving said worm to rotate the fan 12 when the shaft 15 is driven in one direction.

A cable drum 18 is freely rotatable upon the shaft 15, and a cable 19 is wound upon said drum. This cable extends rearwardly from the carriage 5 and is adapted to be held by the operator, so that when the carriage is pushed forwardly, the cable will unwind and rotate the drum 18. Preferably, a rubber pad or plate 20 or an equivalent member of some other material is connected with the rear end of the cable 19 to be held by one of the operator's feet as shown in Fig. 1. A ratchet connection 21 is provided between the drum 18 and the shaft 15, so that rotation of said drum under the influence of the cable 19, will be transmitted to the shaft 15, causing the elements 17, 14 and 13 to rapidly rotate the fan 12, said ratchet connection permitting said shaft 15 and the elements 17, 14, 13 and 12, to over-run said drum 18, when the forward movement of the carriage stops. Upon each rearward return movement of the carriage, a spring 22 which connects the drum 18 with the shaft 15, rotates said drum in the reverse direction, thereby rewinding the cable 19. The action of this spring by effecting winding of the cable upon the drum, also assists in rearwardly returning the carriage toward the operator.

Whether the invention be embodied in a vacuum cleaner or in some other sort of machine, having a rotary member to be driven, it is simply necessary to move the carriage to and fro, to rapidly drive said rotatable member, and the construction is such that the machine may be operated with ease.

Numerous variations may be made over the present disclosure and obviously all movable parts may be encased if desired.

I claim:—

A machine of the class described comprising a carriage having a rotatable work-performing member, a drum rotatably mounted on said carriage and having a driving connection with said rotatable member, a cable wound on said drum and adapted to be unwound for rotating said drum in a direction to drive said member, a spring wound by drum-rotation in said direction for later rotating said drum in cable rewinding direction, a handle for moving said carriage forwardly and rearwardly while holding the rear end of said cable fixedly, and a footplate on the rear end of said cable upon which the operator stands to hold the cable end; whereby said cable and drum will drive said rotatable member and wind said spring each time the carriage is pushed forwardly, and the wound spring, drum and cable will assist in rearwardly returning said carriage.

In testimony whereof I affix my signature.

HENRY M. KEITH.